United States Patent
Kumano et al.

(10) Patent No.: US 7,325,535 B2
(45) Date of Patent: Feb. 5, 2008

(54) ENGINE CONTROLLER

(75) Inventors: Kengo Kumano, Chiyoda-ku (JP);
Shiro Yamaoka, Chiyoda-ku (JP);
Hiromu Kakuya, Chiyoda-ku (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 11/700,055

(22) Filed: Jan. 31, 2007

(65) Prior Publication Data

US 2007/0215096 A1 Sep. 20, 2007

(30) Foreign Application Priority Data

Mar. 15, 2006 (JP) .............................. 2006-070141

(51) Int. Cl.
*F02M 7/00* (2006.01)
*F02B 5/00* (2006.01)

(52) U.S. Cl. ...................................... 123/435; 123/305

(58) Field of Classification Search ............. 123/90.15, 123/295, 305, 406.11, 434, 435
See application file for complete search history.

(56) References Cited

U.S. PATENT DOCUMENTS 6,739,295 B1* 5/2004 Yamaoka et al. ........ 123/90.15
7,089,913 B2* 8/2006 Yamaoka et al. ...... 123/406.48
2003/0226528 A1* 12/2003 Yamaoka et al. ........ 123/90.15

FOREIGN PATENT DOCUMENTS

JP 2001-82229 A 3/2001
JP 2004-108218 A 4/2004

* cited by examiner

*Primary Examiner*—John T. Kwon
(74) *Attorney, Agent, or Firm*—Crowell & Moring LLP

(57) ABSTRACT

An engine controller controls an actuator for selectively executing spark-ignited combustion and compression-ignited combustion of an internal combustion engine in accordance with an engine operational state. The controller is comprises of a deterioration recognition section for recognizing a deterioration state of the engine or the actuator during the spark-ignited combustion. The engine controller is configured to change at least one of a switching condition between the spark-ignited combustion and compression-ignited combustion and an operational condition for the compression-ignited combustion, during the spark-ignited combustion, in accordance with the deterioration state of the engine or the actuator recognized by the deterioration recognition section.

17 Claims, 8 Drawing Sheets

NEW INJECTOR

FIG. 10(b)

DEGRADED INJECTOR

FIG. 10(c)

ONLY INJECTION QUANTITY CHANGED

FIG. 10(d)

INJECTION QUANTITY AND VALVE TIMING CHANGED

FIG. 11(a)

NEW INJECTOR

CYLINDER PRESSURE

TDC
CRANK ANGLE — MOTORING

FIG. 11(b)

DEGRADED INJECTOR

CYLINDER PRESSURE

TDC
CRANK ANGLE

FIG. 11(c)

ONLY INJECTION QUANTITY CHANGED

CYLINDER PRESSURE

TDC
CRANK ANGLE

FIG. 11(d)

INJECTION QUANTITY AND VALVE TIMING CHANGED

CYLINDER PRESSURE

TDC
CRANK ANGLE

ENGINE CONTROLLER

CLAIM OF PRIORITY

The present application claims priority from Japanese application serial no. 2006-070141, filed on Mar. 15, 2006, the contents of which are hereby incorporated by references into this application.

BACKGROUND OF THE INVENTION

The present invention relates to a controller for an internal combustion engine executing spark-ignited combustion and pre-mixed compression-ignited combustion. More specifically, the invention relates to a technical matter intended for stabilization of compression-ignited combustion even when an engine or an actuator becomes a deterioration condition.

In an internal combustion engine which basically performs spark-ignited combustion, a method in which a part of the engine operation area adopts compression-ignited combustion system instead of spark-ignited combustion system is known. This method makes it possible to reduce NOx emissions and highly efficiently operate the engine. It is expected to optimally control the compression-ignited combustion so as to provide a stable compression-ignited combustion operation over a wide operation range.

According to the description of JP-A No. 82229/2001 or JP-A No. 108218/2003, it is effective for the compression-ignited combustion to control the combustion by means of a mass of internal EGR (fuel injection during a negative valve overlap period) using a variable valve mechanism for an inlet valve and outlet valve of an engine cylinder or by means of a multiple injection.

In the compression-ignited combustion, there is no physical ignition equipment such as spark plug and the piston compression allows a pre-mixed mixture to self-ignite. The control over ignition timing or the like requires accurate fuel injection control or valve timing control. When an actuator for the fuel injection system or the variable valve becomes deteriorated, the compression-ignited combustion is subject to large variations between cylinders or cycles. The stable compression-ignited combustion becomes unavailable.

There is a need for a solution of implementing the stable compression-ignited combustion even when the actuators become deteriorated. According to the technology described in JP-A No. 108218/2004, for example, in order to improve the compression-ignited combustion, the negative valve overlap period or the fuel injection quantity during the negative valve overlap period is changed in accordance with a peak value or a peak timing of a cylinder pressure in the compression-ignited combustion. In this manner, the pressure peak value or the pressure peak timing can be controlled to an appropriate value even when the actuator for the engine or the fuel injection system becomes deteriorated.

The technology described in the patent document performs combustion control by using combustion control means such as the variable valve mechanism and the fuel injection quantity based on a combustion state recognized during the compression-ignited combustion. However, when the deterioration of the engine or its actuators become in remarkable advanced stage, such combustion control can be not enough good any more to the deterioration, as a result, temporary knocking or misfire may occur before or during the compression ignition control.

On the other hand, when the multiple injection controls stabilization of the compression-ignited combustion, the applicants experimentally confirmed that a low load area and a high load area must use one-time fuel injection equivalent to approximately a Minimum Reliable fuel injection quantity (the minimum fuel injection quantity ensuring stable injection for the fuel injection system) of the fuel injection system. Even when normal injection pulse width correction is performed for a deteriorated fuel injection system, these operation areas may not be able to use a specified fuel injection quantity according to the minimum reliable injected quantity. The above-mentioned patent documents give no consideration to these problems and make no mention of a technique of detecting the fuel injection system deterioration or a specific technique of controlling the deterioration detection (recognition).

SUMMARY OF THE INVENTION

The present invention has been made in consideration of the foregoing. It is therefore an object of the present invention to realize stable compression-ignited combustion in as wide an operation range as possible despite deterioration of an actuator for an internal combustion engine or a fuel injection system or despite characteristic deterioration such as temporary deterioration due to deposit adhesion.

In order to solve the above-mentioned problem, an engine controller according to the invention basically has the following subject matter. The engine controller is to control an actuator for selectively executing compression-ignited combustion and spark-ignited combustion of an internal combustion engine in accordance with conditions of the engine. The controller is provided with a deterioration recognition section for recognizing a deterioration state of the engine or the actuator during the spark-ignited combustion. The engine controller further configured to change at least one of a switching condition between the spark-ignited combustion and compression-ignited combustion and the operational condition for the compression-ignited combustion, during the spark-ignited combustion, in accordance with the deterioration state of the engine or the actuator recognized by the deterioration recognition section.

According to such an arrangement, the engine controller can recognize the deterioration state of the engine or the actuator mounted to the engine during spark-ignited combustion. The controller can change the condition for switching to the compression-ignited combustion or the operational condition for the compression-ignited combustion during spark-ignited combustion in advance. Even when the engine or the actuator becomes deteriorated, the controller can ensure an optimal compression ignition range corresponding to the deterioration state or switch to an optimal compression ignition condition before the compression-ignited combustion is done. It is possible to realize stable compression-ignited combustion without knocking or misfire and a variation between cycles. The actuator deterioration includes not only chronological deterioration, but also a temporary variation (deterioration) such as deposit adhesion to the injector.

An example of a secondary matter associated with the above-mentioned subject matter is as follows. The actuator is at least one of: a fuel injection device such as a fuel injection valve for directly or indirectly injecting fuel into a combustion chamber; a variable valve mechanism for changing at least one of an inlet valve timing, an outlet valve timing, and a valve lift amount for an engine cylinder; a throttle valve for controlling an intake air flow rate; a swirl control valve for controlling an intake air flow; and a tumble control valve. The deterioration recognition section uses a signal from at least one of an air-fuel ratio sensor, an $O_2$ sensor, a cylinder pressure sensor, an ion current sensor, an engine speed sensor, a vibration sensor, and an air flow sensor.

The variable valve mechanism can change or control at least a mass of internal EGR or an effective compression ratio by controlling timings of the inlet valve or the outlet valve or valve lift amounts thereof.

According to such an arrangement, the engine controller can individually or concurrently recognize deterioration states of the fuel injection device, the variable valve mechanism, the throttle valve, the swirl control valve, and the tumble control valve as actuators that directly affect air-fuel mixture states (for example, a fuel injection quantity, an intake air flow rate, a mass of internal EGR, and a combustion chamber's inside flow) in the combustion chamber. It is possible to accurately recognize a change of in-combustion chamber air-fuel mixture state that greatly affects the compression-ignited combustion. Accordingly optimal control as to the compression-ignited combustion and the spark-ignited combustion can be provided in accordance with the change in the air-fuel mixture state.

An example of the other secondary matter associated with the above-mentioned subject matter is as follows. The deterioration recognition section is configured to recognize (detect) the deterioration state of the engine or the actuator mounted to the engine when the engine is idling.

According to such an arrangement, the engine controller can reliably recognize deterioration states of the engine or the actuator through idling because the idling is done almost without exception every driving the engine.

An example of the other secondary matter associated with the above-mentioned subject matter is as follows. The operational condition for the compression-ignited combustion is changed by at least one of a fuel injection condition, a variable valve mechanism condition, an intake throttle condition, a swirl control valve condition, and a tumble control valve condition.

According such an arrangement, the engine controller can appropriately control an air-fuel mixture in the combustion chamber even when the engine or the actuator deteriorates. As a result, a stable compression ignition operation is available.

An example of the other secondary matter associated with the above-mentioned subject matter is as follows. The operational condition for the compression-ignited combustion is a minimum reliable fuel injection quantity for the injection valve; and the engine controller is further configured to correct the minimum reliable fuel injection quantity in accordance with a deterioration state of the fuel injection valve and to inhibit said compression-ignited combustion in a part of a compression ignition range: the part where a fuel injection quantity becomes smaller than the corrected minimum reliable fuel injection quantity.

According to such an arrangement, the engine controller can determine a compression ignition range based on a deterioration state of the fuel injection device, especially on a minimum reliable injection quantity of the fuel injection device under a deterioration condition. The compression-ignited combustion is inhibited only in compression ignition partial range determined to be incapable of a stable fuel injection. As a result, the compression-ignited combustion can be performed in as wide an operation area as possible even when the fuel injection device becomes deteriorated.

In further another aspect of the engine controller according to the invention, an actuator to be recognized whether deterioration occurs is a fuel injection valve, and the engine controller is further configured to correct the minimum reliable fuel injection quantity in accordance with a deterioration state of the fuel injection valve. In addition, the engine controller changes a fuel injection quantity executed during the compression-ignited combustion in a part of a compression ignition range when the fuel injection quantity becomes smaller than the corrected minimum reliable fuel injection quantity in the part of the compression ignition range.

According to such an arrangement, the engine controller can change the fuel injection quantity for the compression-ignited combustion in accordance with the deterioration state of the fuel injection valve, especially on the minimum reliable injection quantity of the fuel injection valve under the deterioration condition. A stable fuel injection can be realized when the fuel injection device becomes deteriorated. As a result, the compression ignition combustion can be stably performed without reducing the compression ignition range.

In further another aspect of the engine controller according to the invention, fuel injection valve is a direct injection type which injects fuel into an engine cylinder directly and that is controlled so as to inject fuel at least once during a negative valve overlap where both of an inlet valve and outlet valve of said engine cylinder are closed together for executing internal EGR in a combustion chamber of the engine cylinder. Wherein, when the fuel injection quantity during the negative valve overlap is increased or decreased by controlling the fuel injection quantity, the engine controller decreases or increases a mass of internal EGR or an effective compression ratio by controlling a variable valve mechanism for the inlet valve and outlet valve of the engine cylinder.

According to such an arrangement, the engine controller can change not only the injection quantity for the compression-ignited combustion, but also the valve timing or the valve lift quantity based on the deterioration state of the fuel injection device, especially on the minimum reliable injection quantity of the fuel injection valve under its deterioration condition. The valve timing or the valve lift quantity can be used to correct a change in the compression-ignited combustion state due to a change in the injection quantity. Even when the fuel injection device deteriorates, the compression-ignited combustion can be performed highly efficiently and stably without reducing a compression ignition range or minimizing the reduction. If the fuel injection quantity is increased by controlling the fuel injection quantity during the negative valve overlap, the fuel radicalization may be stimulated to excessively increase the ignitability of the air-fuel mixture. To solve this problem, the variable valve mechanism for the inlet valve and outlet valve is controlled to decrease the mass of internal EGR. Alternatively, an effective compression ratio is decreased to decrease the temperature in the combustion chamber. In this manner, the ignition timing is optimized. On the other hand, if the fuel injection quantity is decreased by controlling the fuel injection quantity during the negative valve overlap, the fuel radicalization may become inactive to degrade the ignitability of the air-fuel mixture. To solve this problem, the variable valve mechanism is controlled to increase the mass of internal EGR. Alternatively, an effective compression ratio is increased to increase the temperature in the combustion chamber. In this manner, the ignitability of the air-fuel mixture is improved.

In further another aspect of the engine controller according to the invention, the deterioration recognition section is provided for each cylinder. A minimum reliable injected quantity of the fuel injection device is corrected for each cylinder. The injection quantity is controlled for each cylinder.

According to such an arrangement, the engine controller can change the injection quantity for each cylinder during the compression-ignited combustion based on a deterioration state of the fuel injection valve for each cylinder, especially on a minimum reliable injected quantity from the fuel injection device under a deteriorated condition. It is possible to improve combustion variations between cylinders.

In further another aspect of the engine controller according to the invention, when the aforementioned switching condition or the operational condition is changed in accordance with the recognized deterioration state, a switching operation for the compression-ignited combustion is disabled for all engine operation area until such condition-changing is completed.

According to such an arrangement, the engine controller inhibits the compression-ignited combustion until recognizing the deterioration state and subsequently determining the compression ignition range or changing the operational condition for the compression-ignited combustion. Thereby it is possible to prevent knocking or misfire during the compression-ignited combustion and realize a stable compression ignition operation.

In further another aspect of the engine controller according to the invention, a system for the fuel injection valve includes a characteristic storing section for pre-storing an individual injection characteristic by itself; and the aforementioned deterioration recognition section uses individual injection characteristic information stored in the characteristic storing section as a reference value for the deterioration recognition.

To be more specific, the fuel injection device itself includes a characteristic storing section for prestoring an individual injection characteristic. The deterioration recognition section further uses individual injection characteristic information stored in the characteristic storing means.

According to such an arrangement, the engine controller can allow the fuel injection device to store injection characteristics of individual new products, for example. It is possible to more accurately detect a deterioration state in consideration for manufacturing variations or individual variations in the fuel injection device.

As has been discussed, the engine controller according to the invention recognizes the deterioration state of the engine or the actuator such as a fuel injection device during spark-ignited combustion. Based on the deterioration state, the controller determines a compression ignition range. Alternatively, the controller changes a fuel injection quantity based on the deterioration state and corrects a combustion state change due to that change by controlling a valve timing or the like. In this manner, the controller can realize a stable compression ignition operation even when the engine or the actuator such as the fuel injection device degrades.

BRIEF DESCRIPTION OF THE DRAWINGS

FIG. 3 exemplifies a fuel injection control technique for the engine controller in FIG. 1, in which

FIG. 10 shows compression-ignited combustion states of a high load area when deterioration is detected in the injector of the engine controller in FIG. 8 and fuel injection control and variable valve control are provided, in which FIG. 11 shows compression-ignited combustion states of a low load area when deterioration is detected in the injector of the engine controller in FIG. 8 and fuel injection control and variable valve control are provided, in which

DESCRIPTION OF THE PREFERRED EMBODIMENTS

Embodiments of a control apparatus for an internal combustion engine according to the invention will be described in further detail with reference to the accompanying drawings.

Figure 1:
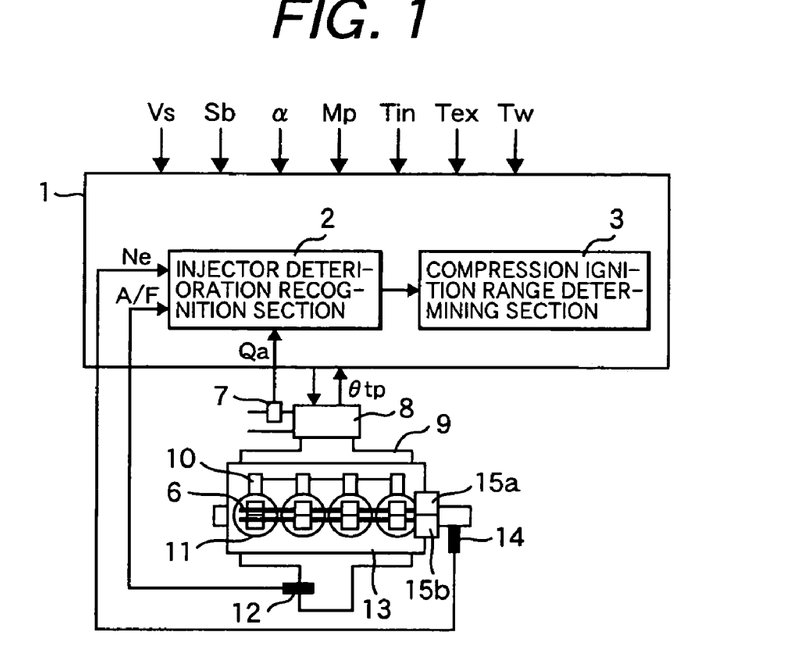
FIG. 1 is an engine system construction diagram showing an engine controller according to a first embodiment of the invention.

FIG. 1 shows a system of the engine controller to a first embodiment of the present invention. The internal combustion engine 13 is a multi-cylinder type engine. The multi-cylinder engine 13 is capable of executing combustion in two modes, i.e., spark-ignited combustion using a spark ignitor and compression-ignited combustion allowing an air-fuel mixture to self-ignite by means of piston compression. The multi-cylinder engine 13 is capable of a highly efficient operation in the compression-ignited combustion mode up to half a full load in terms of an engine torque or in an engine operation area of approximately 1000 to 3000 revolutions in terms of an engine speed. In the multi-cylinder engine 13, the spark-ignited combustion is usually executed in engine operation load areas including an idling state other than the above-mentioned engine operation load area.

A pressure sensor 6 is provided at a cylinder block or a cylinder head of each cylinder of the multi-cylinder engine 13. In the engine system, an air-fuel ratio sensor 12 for sensing an air-fuel ratio in an exhaust pipe, an air flow sensor 7 for sensing an air flow rate in an air intake passage, a throttle device 8 for controlling an air flow rate to be fed into the engine, an intake port 9 for the engine, a fuel injection valve (hereafter referred to as an injector) 10 for each cylinder of the engine, and a engine speed sensor 14 are provided. Basically, the injector 10 is a direct injection type injector capable of directly injecting fuel into a combustion chamber 11 for each cylinder. The throttle device 8 is preferably comprised of an electronically controlled type throttle device in which a throttle valve is actuated by an electric actuator such a motor. The engine 13 is also provided with variable valve mechanisms 15a and 15b for inlet valves (not shown) on the intake side and outlet valves (not shown) on the exhaust side of the multi-cylinders. An engine control unit (hereafter it's called as an ECU for short) 1 as a controller 1 takes in various information to recognize engine operating states and a user's intention, such as a vehicle speed Vs, a brake signal Sb, an accelerator opening α, and a transmission gear ratio (gear position) Mp. The ECU 1 also takes into various other information representing engine operation states as a air-fuel ratio A/F, an intake air flow rate Qa, an engine intake air temperature Tin, an engine exhaust gas temperature Tex, an engine cooling water temperature Tw, a cylinder pressure Pi, an engine speed Ne, and an throttle opening θtp. The ECU (controller) 1 recognizes the engine operational conditions and decides control states of the engine 1. The ECU 1 also is provided with at least a section 2 for recognizing deterioration of each injector (hereafter the section 2 is also called as an injector deterioration recognition section or deterioration recognition section) and a section 3 for determining a compression-ignited operation range for each cylinder of the engine (hereafter the section 3 is also called as a compression ignition range determining section or condition determining section).

The injector deterioration recognition section 2 recognizes an injector deterioration state of the engine for each cylinder based on air-fuel ratio A/F, intake air flow rate Qa, and engine speed Ne etc. The resulting recognition is output to the compression-ignited range determining section 3.

In the ECU 1, the sections 2 and 3 perform various calculations based on output values from the above-mentioned sensors. In accordance with the calculation results, the ECU 1 realizes a preferable compression-ignited operation (combustion) range when the injector is in deteriorated condition. The injector 10 injects a specified amount of fuel in accordance with a target engine torque calculated based on the throttle valve opening signal θtp and accelerator opening signal α. The variable valve mechanisms 15a and 15b are capable of changing timings and valve lift amounts of each inlet valve on the intake side and each outlet valve on the exhaust side, respectively, by means of a hydraulic pressure or motor current control in accordance with operational conditions of the engine, so that optimum controlled mounts of the valve timings and valve lifts are obtained.

Figure 2:
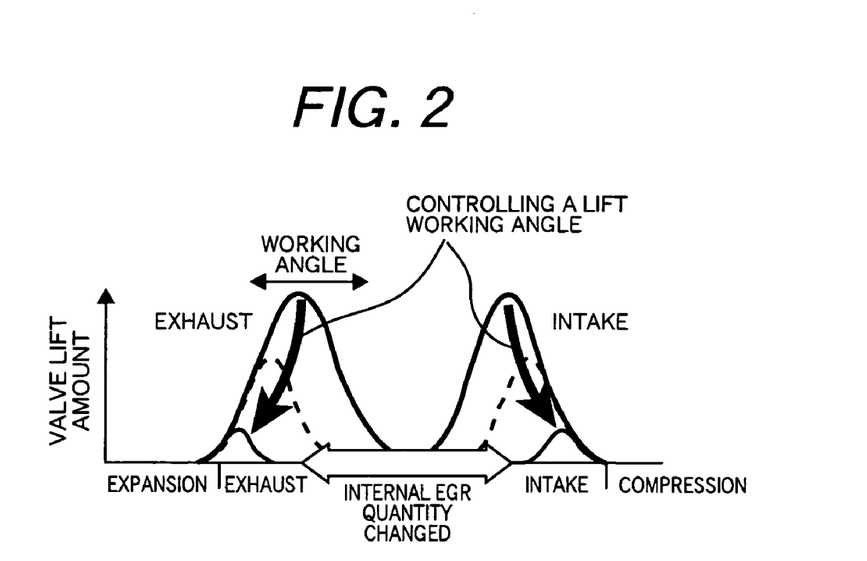
FIG. 2 exemplifies lift curve characteristics of variable inlet and outlet valves for the engine controller in FIG. 1.

FIG. 2 exemplifies lift curve characteristics of the variable valve mechanism 15a and 15b used for the embodiment. As shown in FIG. 2, the variable valve mechanisms 15a and 15b of the embodiment control the valve lift amount and the working angle of each inlet valve and each outlet valve, respectively. In this manner, each of the variable valve mechanisms 15a and 15b varies a time period for trapping the exhaust gas in the cylinder (hereafter referred to as a negative valve overlap time period) to continuously control a mass of internal EGR.

In this case, it may be preferable to provide an electro-magnetically driven valve individually every each cylinder to continuously vary the negative valve overlap time period every for each cylinder. However, according to such an arrangement, as increasing the number of cylinders for a multicylinder engine, the costs of them greatly increase. In consideration of the above-mentioned problem of the costs, the present embodiment provides another arrangement which is an apparatus comprised of an inexpensive mechanism that can variably control the valve lift quantities and the working angles of the respective inlet valves and outlet valves for all cylinders simultaneously. The arrangement can continuously vary the negative valve overlap quantity in accordance with operational conditions and achieve the object of the invention. The following description is based on this arrangement.

Figures 3A, 3B:
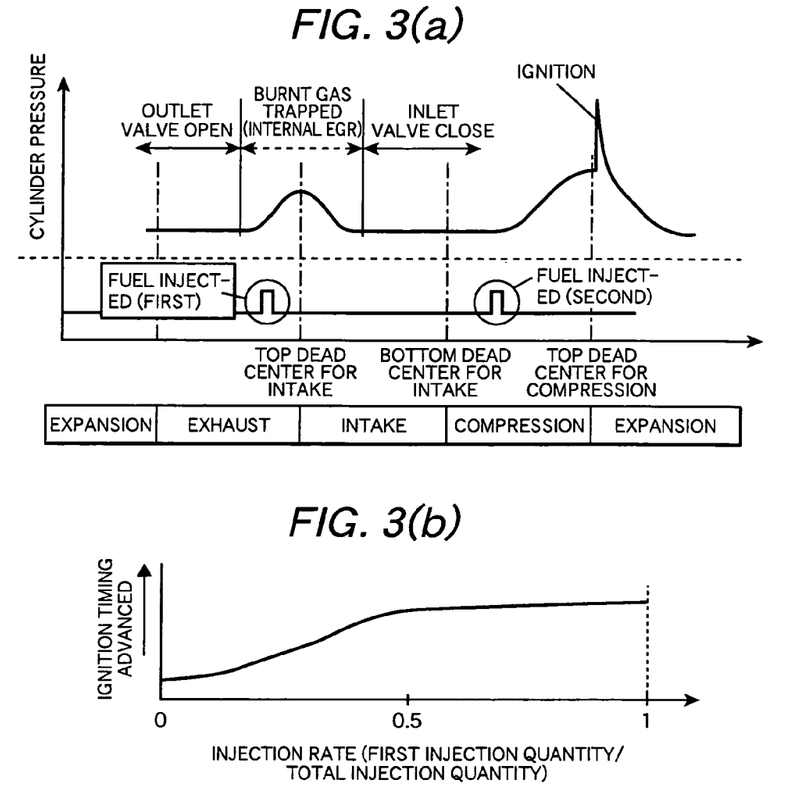
FIG. 3A shows relation ship between an opening-closing operation of the variable inlet valve and outlet valve in each cylinder and plural fuel injection timings (multiple injection times)
FIG. 3B shows relationship between the first fuel injection quantity and the compression ignition timing.

FIG. 3A and FIG. 3B show an example of a fuel injection control technique according to the present embodiment. FIG. 3A shows a relationship between an opening-closing operation of the variable inlet valve and outlet valve in each cylinder and plural fuel injection timings (multiple injection times). FIG. 3B shows a relationship between the first fuel injection quantity and the compression ignition timing. Since the embodiment uses the direct injection device, it is possible to freely control air-fuel mixture states by variably injection timing in accordance with operational conditions of the engine. As shown in FIG. 3A, the fuel injection is divided into more than once. The first injection uses a technique of injecting fuel during a negative valve overlap time period to radicalize part of the fuel. The negative valve overlap time period is used for the compression ignition, and which is a time period where both the inlet valve and the outlet valve are closed between an exhaust stroke and an intake stroke, and in the time period, internal EGR, in which trapped burnt gas and the first injected fuel are mixed in the cylinder, is carried out. Incidentally, in this embodiment, as shown in FIG. 3A, the second injection is executed at the compression stroke, and compression ignition occurs near compression TDC (top dead center). An injection rate is varied for each cylinder to suppress combustion variations between cylinders. As shown in FIG. 3B, as increasing the first injection rate with the total fuel injection quantity unchanged, the radicalization of the fuel is promoted, so that the compression ignition timing advances.

Figure 4:
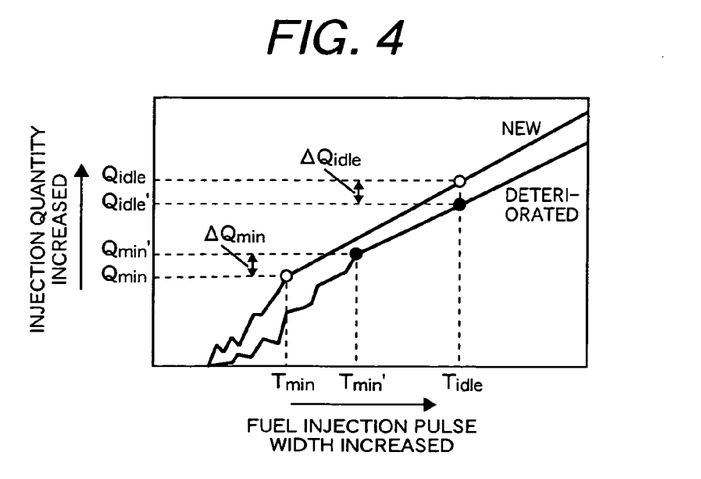
FIG. 4 exemplifies injection characteristics when an injector for the engine controller in FIG. 1 degrades.

FIG. 4 exemplifies injection characteristic changes when the injector became deteriorated. Compared to the injector in "new", the deteriorated injector indicates a changed (decreased) injection quantity by $(Q_{idle}-Q_{idle}')$ for fuel injection pulse width $T_{idle}$ during idling; and Minimum Reliable fuel injection quantity $Q_{min}'$ (corresponding to Minimum Reliable fuel injection pulse width $T_{min}'$) for the deteriorated injector increases compared to Minimum Reliable fuel injection quantity $Q_{min}$ (corresponding to Minimum Reliable fuel injection pulse width $T_{min}$) for the injector in "new". The increased Minimum Reliable fuel injection quantity due to deterioration greatly affects the compression-ignited combustion that is requires the accurate fuel injection control as mentioned above. Therefore, the compression ignition operation needs a countermeasure against the injector deterioration.

The following specifically describes a control method for the engine controller according to the embodiment.

Figure 5:
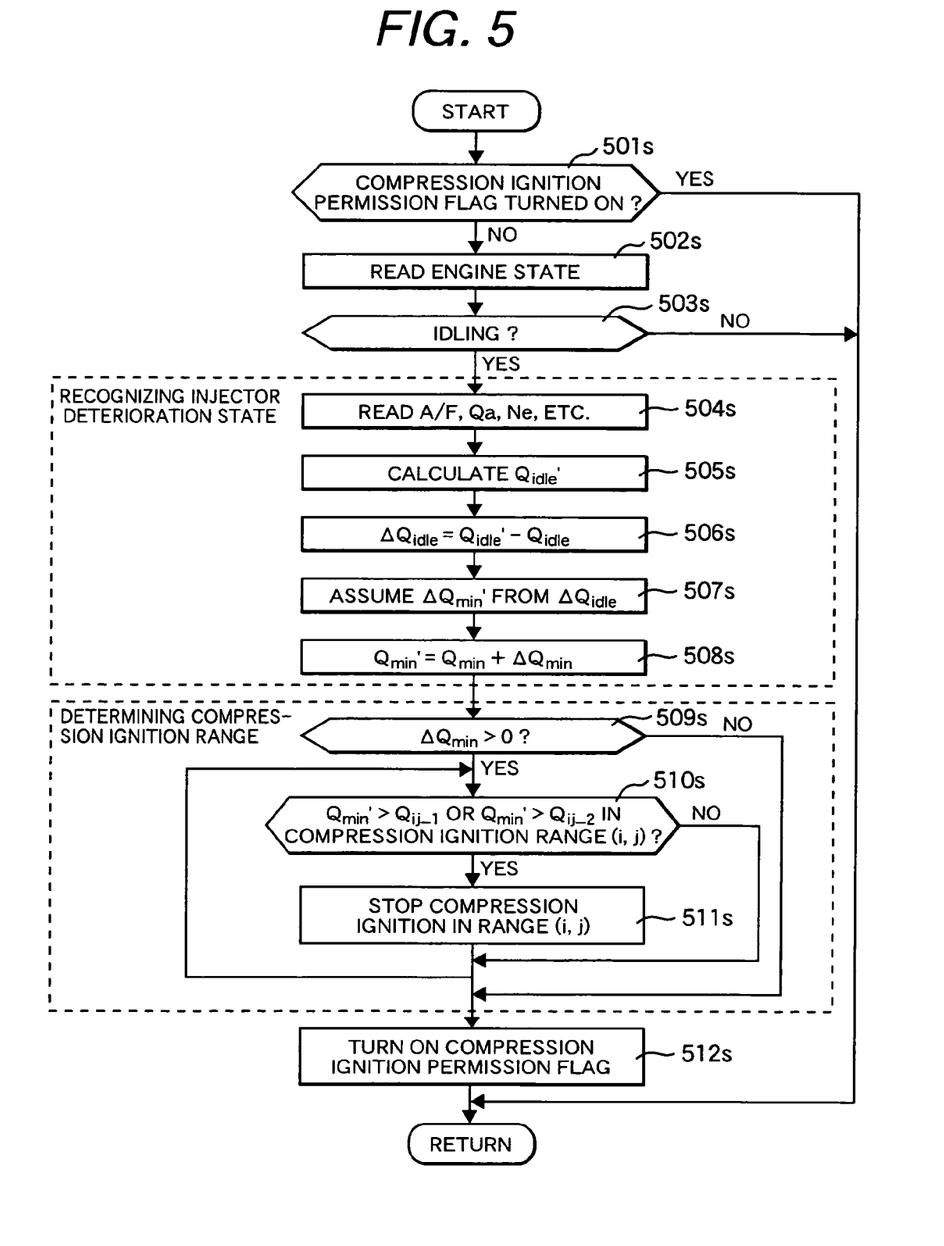
FIG. 5 is a control flowchart for the engine controller in FIG. 1.

FIG. 5 shows a control flowchart for the ECU (controller) 1 ranging from recognition of injector deterioration to determination of a compression ignition operating range. At Step 501s, the ECU 1 determines whether or not a compression ignition operating permission flag is turned on. The compression ignition operating permission flag determines whether or not a compression ignition operation is permitted currently. Turning on this flag permits the engine to perform the compression ignition operation. When the engine starts, the compression ignition operating permission flag is off. When this flag is on, the ECU 1 already has finished the deterioration recognition and the determination of a compression ignition range. In this time, the ECU 1 terminates this control flow without performing the deterioration recognition. When the compression ignition operating permission flag is off, the ECU 1 proceeds to Step 502s. At Step 502s, the ECU 1 reads engine operating states such as engine speed Ne and accelerator opening α, and proceeds to Step 503s. Based on information read at Step 502s, the ECU 1 determines at Step 503s whether or not the engine 13 is idling. When it is determined at Step 503s that the engine 13 is idling, the ECU 1 reads outputs from the air-fuel ratio sensor 12, the speed sensor 14, and the air flow sensor 7 at Step 504s. At Step 505s, based on the information read at Step 504s, the ECU 1 calculates a current injection quantity (hereafter referred to as $Q_{idle}$') per cycle. At Step 506s, the ECU 1 calculates a difference (hereafter referred to as Δ $Q_{idle}$) between calculated $Q_{idle}$' and an injection quantity for the injector in "new" (this injection quantity is hereafter referred to as $Q_{idle}$). At Step 507s, based on Δ $Q_{idle}$, the ECU 1 estimates a change (hereafter referred to as $\Delta Q_{min}$) for the injector's Minimum Reliable injected quantity. At Step 508s, the ECU 1 adds the estimated Δ $Q_{min}$ to a Minimum Reliable injected quantity for the injector in "new" (hereafter referred to as $Q_{min}$) and estimates a Minimum Reliable injected quantity (hereafter referred to as $Q_{min}$') to be defined newly. The process for recognizing the injector's deterioration states terminates at this step. Incidentally, when the above-mentioned recognition (diagnosis) for the deterioration of the injector is executed, if using injection characteristic information pre-stored for individual injectors in "new" as injection information $Q_{idle}$ and $Q_{min}$, it is possible to diagnose the deterioration in consideration for the unevenness on individual products of the injectors.

The ECU 1 proceeds to steps of determining a compression ignition operating range based on the result of recognizing the injector deterioration state. At Step 509s, the ECU 1 determines whether or not there is a change in the injector's Minimum Reliable fuel injection quantity ($\Delta Q_{min}$>0). When it is determined at Step 509s that the Minimum Reliable fuel injection quantity changes, the ECU 1 proceeds to Step 510s. At Step 510s, the ECU 1 compares $Q_{min}$' estimated at Step 508s with the first injection quantity (hereafter referred to as $Q_{ij\_1}$) for the negative valve overlap operation and with the second injection quantity (hereafter referred to as $Q_{ij\_2}$) for the compression stroke in a given compression ignition operating range (i, j), wherein i is the engine torque and j is the engine speed. Specifically, the ECU 1 determines whether or not $Q_{ij\_1}$ or $Q_{ij\_2}$ is smaller than $Q_{min}$' ($Q_{ij\_1}$<$Q_{min}$' or $Q_{ij\_2}$<$Q_{min}$'). At Step 511s, the ECU 1 inhibits compression ignition operation in the compression ignition operating range (i,j) where $Q_{ij\_1}$ or $Q_{ij\_2}$ is assumed to be smaller than $Q_{min}$' at Step 501s. That is, in this time, the ECU 1 determines to perform the spark ignition operation instead of the compression ignition operation. The ECU 1 repeats the above-mentioned calculation for all compression ignition operating ranges to determine a final compression ignition range.

The ECU 1 determines the compression ignition operation range from Steps 509s to 511s and proceeds to Step 512s. At Step 512s, the ECU 1 turns on the compression ignition operating permission flag. Until this control is provided, the ECU 1 does not perform the compression ignition operation but performs the spark ignition operation in all the operation range. This makes it possible to prevent temporary knocking or misfire during the compression ignition operation before this control is provided.

The embodiment estimates $Q_{min}$' by using air-fuel ratio A/F, intake air flow rate Qa, and engine speed Ne during idling. Further, it may be preferable to estimate Minimum Reliable fuel injection quantity $Q_{min}$' for injector deterioration based on a variation rate of mean effective pressure (COV of IMEP) according to the drawing indication calculated from the cylinder pressure during idling.

Figure 6:
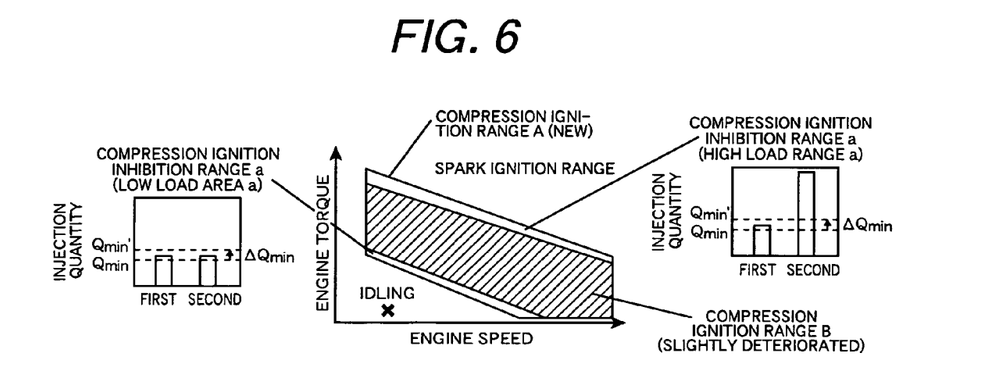
FIG. 6 shows compression-ignited combustion range when a small degree of deterioration is detected in the injector for the engine controller in FIG. 1.

FIG. 6 exemplifies change of a compression ignition operation range with the injector deterioration when the above-mentioned control is provided. In order to avoid knocking due to a rapid pressure increase, the fuel injection rate (the quantity of the first injection) during the negative valve overlap is decreased at a high load side of the compression ignition range with the total fuel injection quantity unchanged. The ignition timing is delayed at the top dead center or later to moderate a pressure increase. Accordingly, the fuel injection quantity during the negative valve overlap approximates to $Q_{min}$.

On the other hand, a low load side of the compression ignition range promotes the ignition to stabilize the combustion. In this case, the fuel injection rate (the quantity: the first injection) during the negative valve overlap increases. But, in this case, since the total fuel injection quantity is originally small, the fuel injection quantity also approximates to $Q_{min}$ for the injection during the negative valve overlap or later.

It can be understood that the injector deterioration especially affects the high and low load sides of the compression ignition range. As shown in FIG. 6, when the Minimum Reliable fuel injection quantity is $Q_{min}$' for the deterioration of the injector, the compression ignition operation is inhibited and instead the spark ignition operation is performed in high load area (A) and low load area (a) where the fuel injection becomes below $Q_{min}$'.

Figure 7:
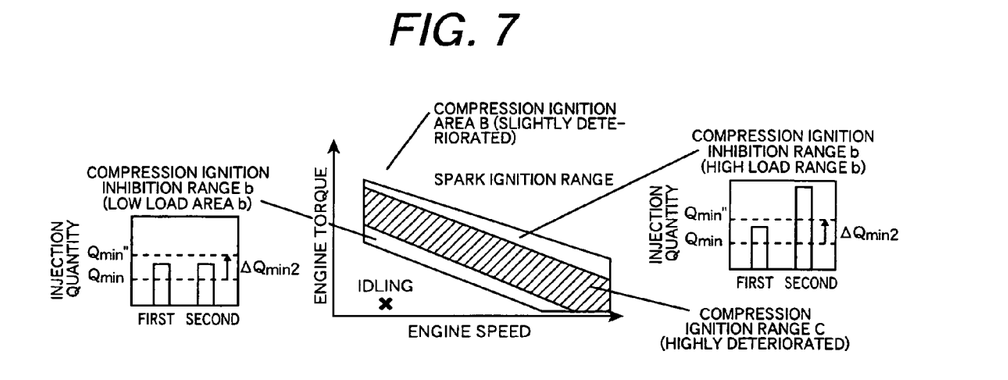
FIG. 7 shows compression-ignited combustion range when a large degree of deterioration is detected in the injector for the engine controller in FIG. 1.

FIG. 7 exemplifies change of the compression ignition operation range when the injector further degrades. The Minimum Reliable fuel injection quantity further increases to be $Q_{min}$". The compression ignition operation is inhibited and instead the spark ignition operation is performed in not only high load area (A) and low load area (a), but also high load area (B) and low load area (b) where the compression ignition operation is allowed in FIG. 6.

The embodiment reduces the compression ignition range step-by-step in accordance with the progress of the injector deterioration.

The above-mentioned controller recognizes the injector deterioration state during the spark-ignited combustion and predetermines a compression ignition range based on the deterioration result. This enables a stable compression ignition operation without causing knocking or misfire even when the injector becomes deteriorated. While there has been described the example of the injector deterioration state, the deterioration recognition based on the result of comparison between initial information in "new" and information with the deterioration is also applicable to the other actuators instead of the injector. Deterioration states according to this application are applicable not only to deterioration with time (deterioration due to a product life), but also to recoverable deterioration (including a temporary change or error in the performance or characteristics) such as temporary clogging of the injector due to deposit adhesion.

Figure 8:
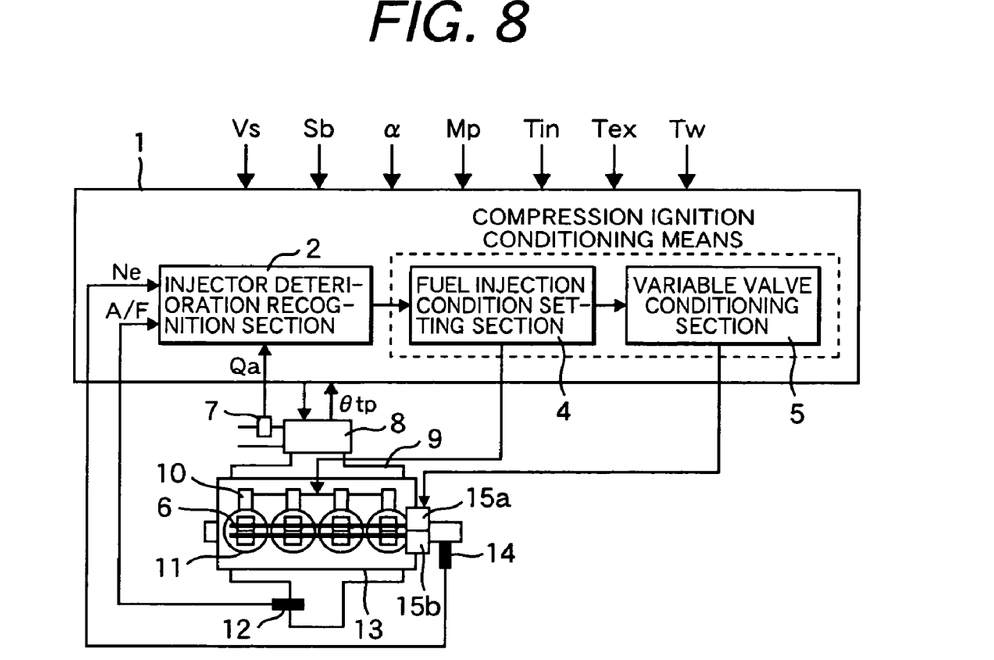
FIG. 8 is an engine system construction diagram showing an engine controller according to a second embodiment of the invention.

FIG. 8 shows a second embodiment of the invention in terms of an engine system arrangement diagram when a result recognized by the injector deterioration recognition section 2 is output to compression ignition condition setting section including fuel injection condition setting section 4 and variable valve condition section 5. The fuel injection condition setting section 4 changes an injection quantity (fuel injection rate) based on a deterioration recognized by the injector deterioration recognition section 2. The variable valve mechanism condition setting section 5 accordingly changes valve timings or valve lift quantities of the inlet valve and the outlet valve in each cylinder of the engine.

The following specifically describes a control method for the engine controller according to the embodiment.

Figure 9:
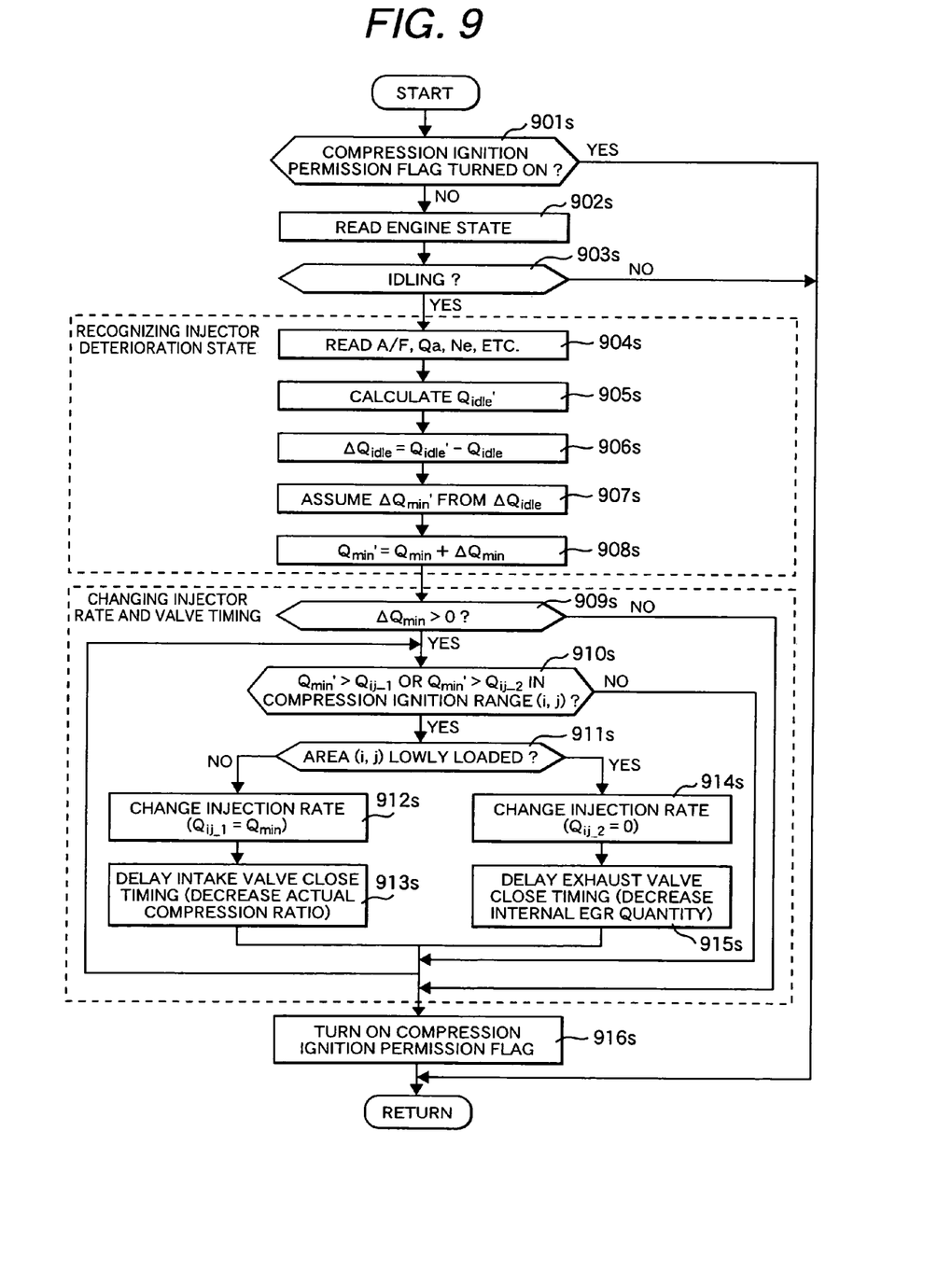
FIG. 9 is a control flowchart for the engine controller in FIG. 8.
Figure 10A:
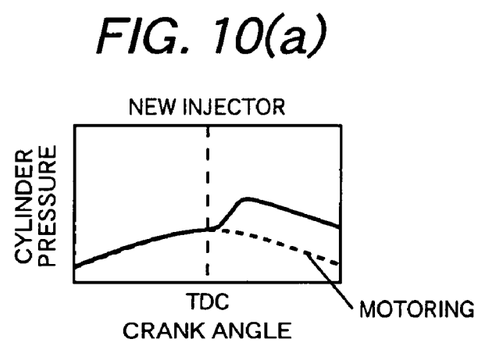
FIG. 10A shows a combustion state for a new injector.
Figure 10B:
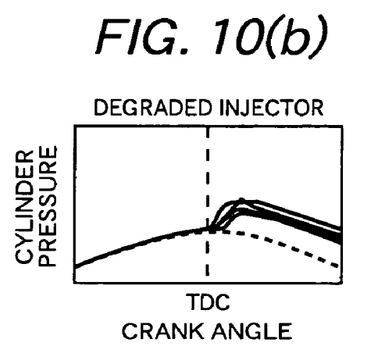
FIG. 10B shows a combustion state for a degraded injector.
Figure 10C:
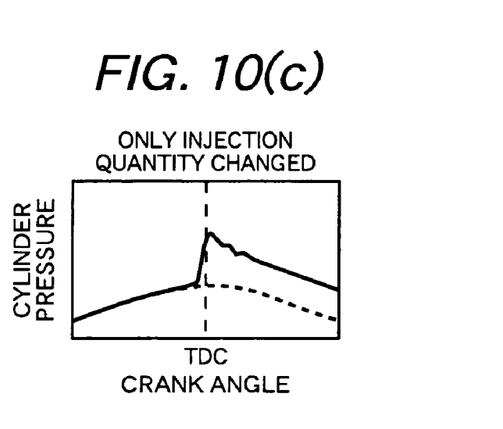
FIG. 10C shows a case of changing only a fuel injection quantity in the state of FIG. 10B.
Figure 10D:
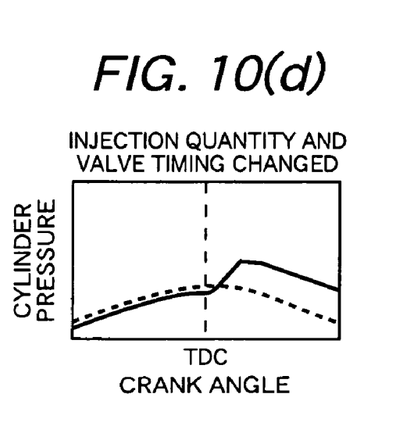
FIG. 10D shows a case where the fuel injection quantity and the valve timing are changed in the state of FIG. 10B in accordance with the flowchart in FIG. 9 to resolve unstable combustion in FIG. 10B and a knocking phenomenon in FIG. 10C.
Figure 11A:
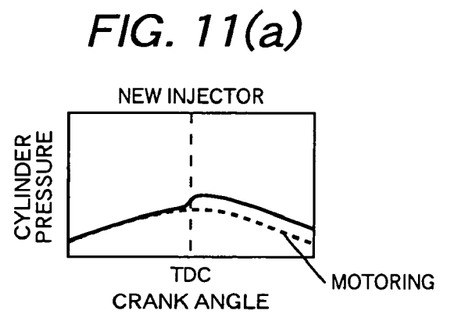
FIG. 11A shows a combustion state for a new injector.
Figure 11B:
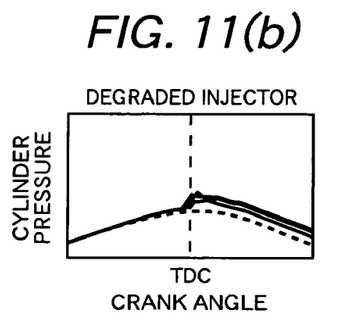
Figure 11C:
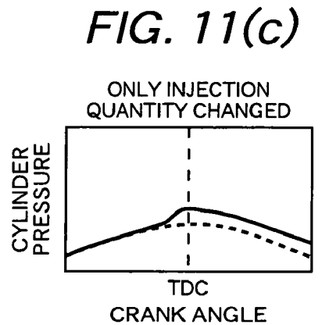
FIG. 11C shows a case of changing only a fuel injection quantity in the state of FIG. 11B.
Figure 11D:
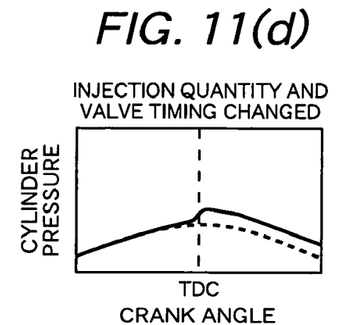
FIG. 11D shows a case where the fuel injection quantity and the valve timing are changed in the state of FIG. 11B in accordance with the flowchart in FIG. 9 to resolve unstable combustion in FIG. 11B and inefficient combustion in FIG. 11C.

FIG. 9 shows a control flowchart for the ECU (controller) 1 from recognition of injector deterioration to injection rate control and variable valve control. Steps 901s to 908s of detecting the injector deterioration (estimating $Q_{min}'$) are the same as the equivalent in the first embodiment.

At Step 909s, the ECU 1 determines whether or not there is a change in the Minimum Reliable fuel injection quantity for the injector. When it is determined at Step 909s that the Minimum Reliable fuel injection quantity changes, the ECU 1 proceeds to Step 910s. At Step 910s, the ECU 1 compares $Q_{min}'$ estimated at Step 908s with the first injection quantity (hereafter referred to as $Q_{ij\_1}$) for the negative valve overlap and with the second injection quantity (hereafter referred to as $Q_{ij\_2}$) for the compression stroke process in a given compression ignition range (i, j). Specifically, the ECU 1 determines whether or not $Q_{ij\_1}$ or $Q_{ij\_2}$ is smaller than $Q_{min}'$ ($Q_{ij\_1}<Q_{min}'$ or $Q_{ij\_2}<Q_{min}'$). When it is determined at Step 910s that $Q_{ij\_1}$ or $Q_{ij\_2}$ is smaller than $Q_{min}'$, the ECU 1 determines whether or not the operation area (i, j) is a low load area. When it is determined at Step 911s that the operation area (i, j) is a high load area, the ECU 1 proceeds to Step 912s. At Step 912s, the ECU 1 changes the fuel injection rate. For example, increasing $Q_{ij\_1}$ to $Q_{min}'$ enables stable fuel injection. As shown in FIG. 3B, however, increasing $Q_{ij\_1}$ advances the compression ignition timing and forces a pressure increase rate to exceed an acceptable value, causing a problem of knock vibration or noise. To solve this problem, at Step 913s, the ECU 1 delays the timing for closing the inlet valve and decreases the effective compression ratio. This decreases the temperature in the cylinder, delays the ignition timing, and moderates an increase in the pressure. Though not shown at Step 913s, the embodiment may delay the ignition timing by delaying the timing for closing the outlet valve and decreasing the mass of internal EGR. When it is determined at Step 911s that the operation area (i,j) is a low load area, the ECU 1 proceeds to Step 914s. At Step 914s, the ECU 1 changes the fuel injection rate. In the low load area, since the total injector quantity is originally small, increasing $Q_{min}$ may disable the two-time injection itself. To enable the stable fuel injection, for example, $Q_{ij\_2}$ is set to 0 and the entire fuel is injected at the first injection. As mentioned above, changing the fuel injection rate advances the ignition timing and disables the optimum ignition timing. The thermal efficiency and the combustion stability degrade. As a solution, at Step 915s, the ECU 1 delays the timing for closing the outlet valve and decreases the mass of internal EGR to decrease the temperature in the cylinder. This enables an optimal ignition timing and ensures the thermal efficiency and the combustion stability. At Step 915s, though not shown in the flowchart according to the embodiment, the ECU 1 may set $Q_{ij\_1}$ to 0 to inject the entire fuel at the second injection and ensure the stable fuel injection. At Step 916s, the ECU 1 may advance the timing for closing the outlet valve and increase the mass of internal EGR to cancel the compression ignition timing delay due to the change. The ECU 1 repeats the above-mentioned calculation for all compression ignition range and proceeds to Step 916s. The compression ignition enabling flag turns on to complete the sequence of the control steps.

FIG. 10 exemplifies compression-ignited combustion states of the high load area in accordance with the fuel injection quantity change method and the variable valve mechanism control method described so far after the injector deterioration recognition. As shown in FIG. 10A, the injector in "new" is capable of stable combustion. When the injector deteriorates as shown in FIG. 10B, unstabled fuel injection increases a variation between combustion cycles, disabling a stable compression ignition operation. FIG. 10C is an example of changing only the fuel injection quantity when the injector deteriorates. Changing the fuel injection quantity stabilizes the fuel injection. However, the injection quantity increases during the negative valve overlap time period and the ignition timing advances to cause knocking. FIG. 10D shows a combustion state after changing the fuel injection quantity and the valve timing as shown in FIG. 9. The timing for closing the inlet valve is delayed to decrease the effective compression ratio and decrease the temperature in the cylinder being compressed. This cancels the effect of advancing the compression ignition timing due to a fuel injection quantity change and ensures an optimal ignition timing. Accordingly, a stable compression ignition operation becomes available even when the injector degrades.

FIG. 11 exemplifies combustion states of the low load area in accordance with the fuel injection quantity change method and the variable valve control method described so far after the injector deterioration recognition. As shown in FIG. 11A, a injector in "new" is capable of executing stable combustion. When the injector deteriorates as shown in FIG. 11B, similarly to the high load area, unstabled fuel injection increases a variation between combustion cycles, disabling a stable compression ignition operation. FIG. 11C is an example of changing only the fuel injection quantity when the injector degrades. Changing the fuel injection quantity stabilizes the fuel injection. However, the fuel injection quantity increases during the negative valve overlap period and the ignition timing occurs too early, disabling a highly efficient operation. FIG. 11D shows a combustion state after changing the fuel injection quantity and the valve timing as shown in FIG. 9. The timing for closing the outlet valve is delayed to decrease the mass of internal EGR and decrease the temperature in the cylinder being compressed. This cancels the effect of advancing the ignition timing due to a fuel injection quantity change and ensures an optimal ignition timing. Accordingly, a highly efficient compression ignition operation becomes available even when the injector deteriorates.

As mentioned above, the embodiment first changes the fuel injection rate upon recognition (detection) of the injector deterioration and then controls the variable valve to correct a combustion state variation due to that change. It is possible to realize a highly efficient and stable compression ignition operation without reducing the compression ignition range even when the injector deteriorates.

As the first embodiment, it has been described the control means for reducing the compression ignition range when the injector deteriorates. As the second embodiment, it has been described the control means for changing operational conditions including the fuel injection condition and the variable valve condition for the compression-ignited combustion. It is also possible to reduce the compression ignition range or change operational conditions depending on the injector's deterioration states. The fuel injection quantity correction can cause a swirl flow or a tumble flow to be controlled for the fuel injection condition, the swirl control valve condition, or the tumble control valve condition. When these flows increase, it is also possible to control the temperature in the combustion chamber and the compression ignition by making the combustion stratified or lean, adjusting intake throttle conditions, or controlling the succeeding conditions. Any of the above-mentioned operational conditions and a combination of these can contribute to the control over the compression combustion.

What is claimed is:

1. An engine controller which controls an actuator for selectively executing spark-ignited combustion and compression-ignited combustion of an internal combustion engine in accordance with an engine operational state, comprising:
    a deterioration recognition section for recognizing a deterioration state of said engine or said actuator during said spark-ignited combustion,
    wherein said engine controller is configured to change at least one of a switching condition between said spark-ignited combustion and compression-ignited combustion and an operational condition for said compression-ignited combustion, during said spark-ignited combustion, in accordance with said deterioration state of said engine or said actuator recognized by said deterioration recognition section.

2. The engine controller according to claim 1,
    wherein said actuator is at least one of a fuel injection valve for directly or indirectly injecting fuel into a combustion chamber of said engine; a variable valve mechanism for changing at least one of an inlet valve-timing, an outlet valve timing, an inlet valve-lift amount and an outlet valve-lift amount for a engine cylinder; a throttle valve for controlling an intake air flow rate to be fed to said engine; a swirl control valve for making a swirl flow in combustion chamber of said engine cylinder, and a tumble control valve for making flow in said combustion chamber.

3. The engine controller according to claim 1,
    wherein the deterioration recognition section uses a signal from at least one of an air-fuel ratio sensor, an $O_2$ sensor, a cylinder pressure sensor, an ion current sensor, an engine speed sensor, a vibration sensor, and an air flow sensor in said engine to recognize said deterioration state.

4. The engine controller according to claim 1,
    wherein said deterioration recognition section is configured to execute recognition for said deterioration state of said engine or said actuator when said engine is idling.

5. The engine controller according to claim 1,
    wherein said operational condition for said compression-ignited combustion is changed by at least one of a fuel injection condition, a variable valve mechanism condition, an intake throttle condition, a swirl control valve condition, and a tumble control valve condition.

6. The engine controller according to claim 1,
    wherein said actuator is a fuel injection valve; said operational condition for said compression-ignited combustion is a minimum reliable fuel injection quantity of said injection valve; and said engine controller is further configured to correct said minimum reliable fuel injection quantity in accordance with a deterioration state of said fuel injection valve and to inhibit said compression-ignited combustion in a part of a compression ignition range: the part where a fuel injection quantity becomes smaller than said corrected minimum reliable fuel injection quantity.

7. The engine controller according to claim 1
    wherein said actuator is a fuel injection valve; said operational condition for said compression-ignited combustion is a minimum reliable fuel injection quantity of said injection valve; and said engine controller is further configured to correct said minimum reliable fuel injection quantity in accordance with a deterioration state of said fuel injection valve and to change a fuel injection quantity executed during said compression-ignited combustion in a part of a compression ignition range: the part where said fuel injection quantity becomes smaller than said corrected minimum reliable fuel injection quantity.

8. The engine controller according to claim 7,
    wherein said fuel injection valve is a direct injection type which injects fuel into an engine cylinder directly and that is controlled so as to inject fuel at least once during a negative valve overlap where both of an inlet valve and outlet valve of said engine cylinder are closed together for executing internal EGR in a combustion chamber of said engine cylinder; and
    wherein, when said fuel injection quantity during said negative valve overlap is increased by controlling said fuel injection quantity, said engine controller decreases a mass of internal EGR or an effective compression ratio by controlling a variable valve mechanism for said inlet valve and outlet valve of said engine cylinder.

9. The engine controller according to claim 7,
    wherein said fuel injection valve is a direct injection type which injects fuel into an engine cylinder directly and that is controlled so as to inject fuel at least once during a negative valve overlap where both of an inlet valve and outlet valve of said engine cylinder are closed together for executing internal EGR in a combustion chamber of said engine cylinder; and
    wherein, when said fuel injection quantity during said negative valve overlap is decreased by controlling said fuel injection quantity, said engine controller increases a mass of internal EGR or an effective compression ratio by controlling a variable valve mechanism for said inlet valve and outlet valve of said engine cylinder.

10. The engine controller according to claim 7,
    wherein said deterioration recognition section is provided for each engine cylinder;
    wherein said minimum reliable fuel injection quantity of the fuel injection system is corrected for each cylinder; and
    wherein the fuel injection quantity is changed for each cylinder.

11. The engine controller according to claim 1,
    wherein, when said switching condition or said operational condition is changed in accordance with said recognized deterioration state, a switching operation for said compression-ignited combustion is disabled for all engine operation area until such condition-changing is completed.

12. The engine controller according to claim 1,
    wherein the deterioration recognition section includes a characteristic storing section for pre-storing an initial characteristic of said actuator and recognizes deterioration of said actuator based on a result of comparison between said initial characteristic and an output characteristic of said actuator obtained during spark-ignited combustion.

13. The engine controller according to claim 6,
wherein a system for said fuel injection valve includes a characteristic storing section for pre-storing an individual injection characteristic by itself; and
wherein said deterioration recognition section uses individual injection characteristic information stored in said characteristic storing section as a reference value for said deterioration recognition.

14. The engine controller according to claim 2,
wherein said variable valve mechanism is used to control a mass of internal EGR or an effective compression ratio for the engine.

15. The engine controller according to claim 1,
wherein said deterioration recognition section recognizes said deterioration state when the engine controller starts and spark-ignited combustion is available before initiation of compression ignition.

16. The engine controller according to claim 1,
wherein said engine controller is configured to change a drive signal for said actuator so as to make up deterioration of said actuator based on said deterioration state of said actuator recognized by said deterioration recognition section or to inhibit compression-ignited combustion when said deterioration state becomes lower than a predetermined value.

17. A control method for an internal combustion engine with a controller which is capable of switching between spark-ignited combustion and compression-ignited combustion of said engine in accordance with an engine operational state, the method comprising the steps of:
recognizing a deterioration state of said engine or its actuator during said spark-ignited combustion; and
changing at least one of a switching condition between said spark-ignited combustion and compression-ignited combustion and an operational condition for said compression-ignited combustion, during said spark-ignited combustion, in accordance with said deterioration state of said engine or said actuator recognized by said deterioration recognition section.

* * * * *